United States Patent [19]

Ishikawa

[11] Patent Number: 5,307,471
[45] Date of Patent: Apr. 26, 1994

[54] MEMORY CONTROLLER FOR SUB-MEMORY UNIT SUCH AS DISK DRIVES

[75] Inventor: Yutaka Ishikawa, Tokyo, Japan

[73] Assignee: NEC Corporation, Tokyo, Japan

[21] Appl. No.: 648,168

[22] Filed: Jan. 31, 1991

[30] Foreign Application Priority Data

Jan. 31, 1990 [JP] Japan ................................... 2-22644
Feb. 20, 1990 [JP] Japan ................................... 2-40145

[51] Int. Cl.$^5$ ....................... G06F 13/00; G06F 13/42
[52] U.S. Cl. ................................. 395/425; 364/243.41;
364/148.3; 364/970.5; 364/232.7; 364/DIG. 1;
364/DIG. 2; 365/49
[58] Field of Search .......... 364/243.41, 200 MS File,
364/900 MS File, 232.7, 970.5; 395/425;
365/49

[56] References Cited

U.S. PATENT DOCUMENTS

| 4,157,587 | 6/1979 | Joyce et al. ........................... 364/200 |
| 4,831,520 | 5/1989 | Rubinfeld et al. .................... 364/200 |
| 4,851,991 | 7/1989 | Rubinfeld et al. .................... 364/200 |
| 5,025,366 | 6/1991 | Baror ..................................... 359/425 |
| 5,119,485 | 6/1992 | Ledbetter, Jr. et al. ............. 395/425 |

Primary Examiner—Alyssa H. Bowler
Assistant Examiner—B. James Peikari
Attorney, Agent, or Firm—Whitham & Marhoefer

[57] ABSTRACT

A controller coupled to a host system, an external storage unit and a temporary memory performs a simultaneous data transfer thereamong. The controller includes an interface unit coupled to the host system, a buffer memory coupled to the external storage unit, a data transfer control unit coupled to the interface unit and the buffer memory, and a bus interconnecting the interface unit, the buffer memory and the temporary memory to one another. The data transfer control unit includes sequencing circuitry for generating first and second enable-signals substantially simultaneously and then generating one of first and second read signals and one of second and first write signals while instructing the temporary memory to fetch data onto the bus. The interface unit is supplied with the first enable-signal, the first read signal and the first write signal from the sequencing circuitry for outputting data therein onto the bus in response to the first read signal while receiving the first enable-signal and for fetching data on the bus in response to the first write signal while receiving the first enable-signal. The buffer memory is supplied with the second enable-signal, the second read signal and the second write signal from the sequencing circuitry for outputting data therein onto the bus in response to the second read signal while receiving the second enable-signal and for fetching data on the bus in response to the second write signal while receiving the second enable-signal.

3 Claims, 5 Drawing Sheets

MEMORY CONTROLLER FOR SUB-MEMORY UNIT SUCH AS DISK DRIVES

BACKGROUND OF THE INVENTION

The present invention relates to a controller for controlling an external storage or sub-memory unit such as a hard disk drive, a floppy disk drive, an optical disk drive and a cartridge magnetic tape drive employed in an information processing system and, more particularly, to an improvement in a data transfer control unit in such a memory controller.

An information processing system, which processes, manages and stores a great amount of data, includes one or more external storage or sub-memory units described above in addition to a main memory unit. A memory controller is thus required which intervenes between a host processor and the sub-memory unit to perform a data transfer operation therebetween. In general, such a memory controller includes an interface control unit for interfacing with the host processor, a buffer memory for temporarily storing data read from or to be written into the sub-memory unit, and a data transfer control unit for performing a data transfer operation between the interface control unit and the buffer memory. In accordance with requests from the host processor, the memory controller writes data from the host processor into the sub-memory unit and reads data from the sub-memory unit to the host processor.

The host processor often requires to obtain data that are the same as the data which were written into or read from the sub-memory unit by the previous request. Even in such a case, if the memory controller is constructed to perform the data read operation from the sub-memory unit whenever the access request is generated from the host processor, it takes a relatively long time to transfer the required data to the host processor. This is because the access speed of the sub-memory unit is slow.

In order to solve this problem, it has been proposed to apply a so-called cache memory technique to the memory controller for the sub-memory unit. Specifically, the memory controller is constructed to be connected with or to include a cache memory for storing a part of data written in the sub-memory unit and the data transfer control unit is added with a function of controlling the cache memory. Accordingly, if the cache memory stores data that are the same as the data required by the host processor, those data are read out of the cache memory and then transferred via the interface unit to the host processor. No data read operation from the sub-memory unit is thus required. On the other hand, in case where the cache memory does not store the data required by the host processor, the data read operation from the sub-memory unit is initiated. The data read from the sub-memory unit is first temporarily stored in the buffer memory. The data thus stored in the buffer memory is then transferred to the cache memory under the control of the data transfer control unit. Thereafter, the data read operation from the cache memory is initiated, so that the data is transferred to the interface unit from the cache memory and finally to the host processor.

Thus, the data transfer speed is improved remarkably in case of the cache memory storing the required data, but the data transfer speed is lowered extremely in the case of the cache memory not storing the required data since the data read out of the sub-memory unit is transferred from the buffer memory to the interface unit under the intervention of the cache memory. Moreover, when the host processor requires to write data into the sub-memory unit, that data is first stored into the cache memory from the interface unit and thereafter transferred to the buffer memory from the cache memory. The data write speed into the sub-memory unit is thereby lowered.

SUMMARY OF THE INVENTION

Therefore, an object of the present invention is to provide an improved controller for performing a data transfer between a host processor and an external storage or sub-memory unit at a high speed.

Another object of the present invention is to provide a memory controller capable of performing a data transfer from an interface unit coupled to a host processor simultaneously to both of a buffer memory coupled to an external storage (sub-memory) unit and a cache memory and/or from the buffer memory simultaneously to both of the interface unit and the cache memory.

According to the present invention, there is provided a controller coupled to a host processor, an external storage unit and a cache memory for performing a data transfer thereamong, comprising an interface unit coupled to the host processor, a buffer memory coupled to the external storage unit, a data transfer control unit, and a bus for interconnecting the interface unit, the buffer memory and the cache memory to one another. Further, the interface unit includes a selection terminal supplied with a first selection signal, a read terminal supplied with a first read signal and a write terminal supplied with a first write signal, outputs data therein onto the bus in response to the first read signal while receiving the first selection signal and fetches data on the bus in response to the first write signal while receiving the first selection signal. Similarly, the buffer memory includes a selection terminal supplied with a second selection signal, a read terminal supplied with a second read signal and a write terminal supplied with a second write signal, outputs data therein onto the bus in response to the second read signal while receiving the second selection signal and fetches data on the bus in response to the second write signal while receiving the second selection signal. The cache memory receives memory read and write signals. The memory read signal causes the cache memory to output data therein onto the bus and the memory write signal cause the cache memory to fetch data on the bus. The data transfer control unit controls the above-mentioned signals such that the first and second selection signals are generated at the substantially same time and the first (or second) read signal, the second (or first) write signal and the memory write signal are then generated.

Thus, the data from the interface unit is transferred simultaneously to both of the buffer memory and the cache memory or the data from the buffer memory is transferred simultaneously to both of the interface unit and the cache memory.

BRIEF DESCRIPTION OF THE DRAWINGS

The above and other objects, advantages and features of the present invention will be more apparent from the following description taken in conjunction with the accompanying drawings, in which.

DETAILED DESCRIPTION OF THE INVENTION

Figure 1:
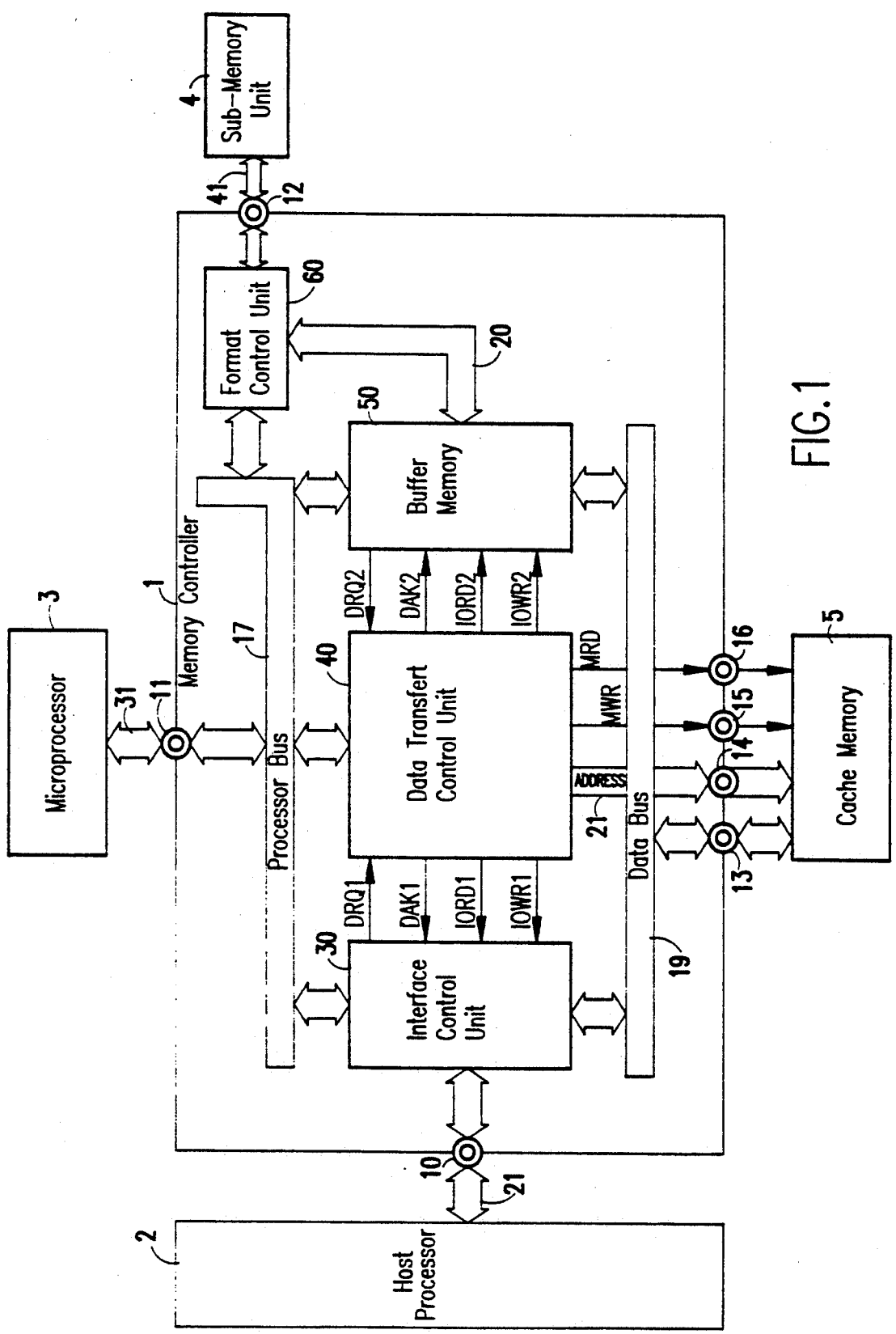
FIG. 1 is a block diagram representative of a part of an information processing system employing a memory controller according to an embodiment of the present invention.

Referring to FIG. 1, a memory controller 1 according to an embodiment of the present invention is fabricated as an integrated circuit device and includes an interface control unit 30, a data transfer control unit 40, a buffer memory 50 and a format control unit 60. The interface control unit 30 interfaces with a host processor 2 in a so-called SCSI (Small Computer System Interface) method and is thus coupled through a first set of terminals 10 and a SCSI bus 21 to the host processor 2. The format control unit 60 is coupled through a second set of terminals 12 and a communication bus 41 to a sub-memory unit 4 to read or write data from or into the unit 4. In this embodiment, a hard disk drive is used as the unit 4. If desired, other units such as a floppy disk drive, an optical disk drive and a cartridge magnetic tape drive can be used. The data to be written into the sub-memory unit 4 and the data read therefrom are transferred between the format control unit and the buffer memory 50. A FIFO (First-in First-Out) type memory can be used as the buffer memory 50. The interface control unit 30, the data memory 50 and the format control unit 60 are interconnected via a internal processor bus 17 to a third set of terminals 11 which is in turn coupled to a microprocessor 3 via an external processor bus 31. The microprocessor 3 controls operations of the memory controller 1.

The data transfer control unit 40 is further coupled to the bus 17. In this embodiment, this control unit 40 performs a data transfer operation in a DMA (Direct Memory Access) transfer manner. More specifically, the control unit 40 receives from the interface unit 30 a first data transfer request signal DRQ1 representing that the unit 30 is in a ready condition for outputting data transferred from the host processor 2 or receiving data to be transferred thereto and from the buffer memory a second data transfer request signal DRQ2 representing that the memory 30 is in a ready condition for outputting data transferred from the format control unit 60 or receiving data to be transferred thereto. In response to the request signal DRQ1, the unit 40 returns an acknowledge signal DAK1 to the interface unit 30 to bring the unit 30 into an activated condition. The unit 40 also responds to the request signal DRQ2 and returns an acknowledge signal DAK2 to the buffer memory 50 to bring the memory 50 into an activated condition. The acknowledge signals DAK1 and DAK2 thus serve as a chip-select signal for the corresponding unit. While the data transfer control unit 40 generates data read and write control signals that causes the unit 30 or the memory 50 to output data stored therein and to fetch data supplied thereto, respectively, it generates the data read and write control signals IORD1 and IOWR1 for the interface unit 30 and those IORD2 and IOWR2 for the buffer memory 50 independently of each other in accordance with the present invention. The read control signals IORD1 and IORD2 indicate a data read timing at which the unit 30 and the memory 50 are to output the data stored therein, respectively, and the write control signals IOWR1 and IOWR2 indicate a data write timing at which the unit 30 and the memory 50 is to fetch the data supplied thereto. The data transfer between the unit 30 and the memory 50 is carried out via an internal data bus 19 to which the transfer control unit 40 and a fourth set of terminals 13 are further coupled. The set of terminals 13 is coupled to a cache memory 5 which is provided externally. The data transfer control unit 40 further generates address information and memory read and write control signals MRD and MWR. The address information is transferred via an address bus 21 and a fifth set of terminals 14 to the cache memory 5 and the signals MRD and MWR are supplied via terminals 15 and 16 thereto.

Figure 2:
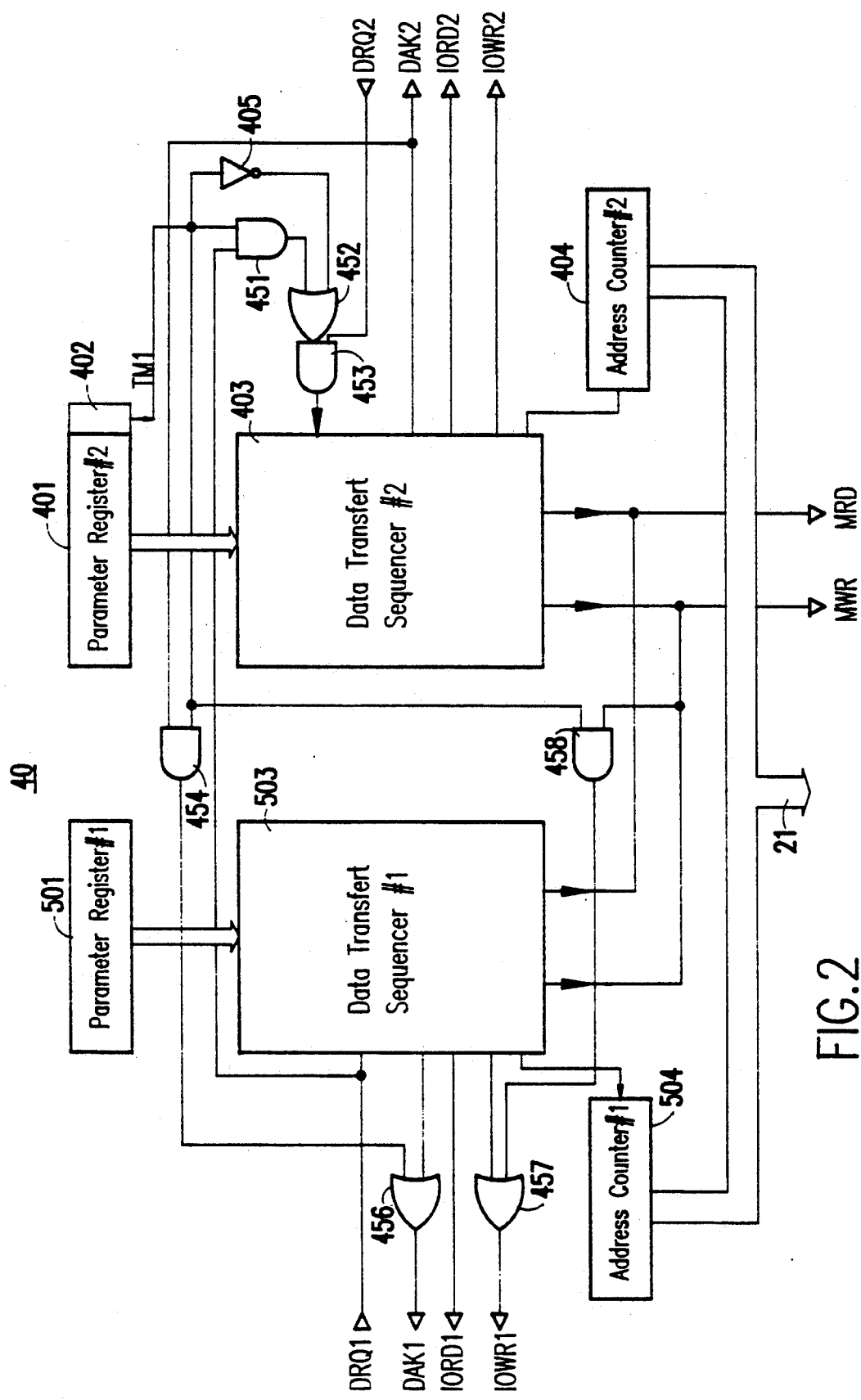
FIG. 2 is an internal block diagram representative of a data transfer control unit of the memory controller shown in FIG. 1.

Referring to FIG. 2, the data transfer control unit 40 includes a pair of parameter registers 401 and 501, a pair of data transfer sequencers 403 and 503 and a pair of address counters 404 and 504. The register 401, the sequencer 403 and the counter 404 are allotted to the data memory 50 and the register 501, the sequencer 503 and the counter 504 are allotted to the interface control unit 30. Each of the registers 401 and 501 is set by the microprocessor 3 with parameter data including transfer direction information for designating a data transfer direction, byte-number information for representing the number of byte data to be transferred, transfer-enable information for allowing a data transfer and so forth. Each of the address counters 404 and 504 are also set by the microprocessor 3 with a start address for designating a data transfer start address of the cache memory 5. In response to the contents of the parameter registers 401 and 501 and to the request signals DRQ1 and DRQ2, the sequencers 403 and 503 produce the control signals DAK1 and 2, IORD1 and 2, IOWR1 and 2, MRD and MWR in a predetermined sequence and update the addresses of the counters 404 and 405, respectively. In accordance further with the present invention, there are provided four AND gates 451, 453, 454 and 458, three OR gates 452, 456, 457 and an inverter 450 which are connected as shown. Moreover, the parameter register 401 has an additional mode flag 402 which is set of "1" when the simultaneous data transfer from the buffer memory 50 to the cache memory 5 and to the interface unit 30 is performed and reset to "0" when other data transfers are performed. The microprocessor 3 sets or resets the flag 402.

In operation, when the interface control unit 30 receives from the host processor 2 a command that the host processor 2 requires data from the sub-memory unit 4, the unit 30 transfers that command to the microprocessor 3 via the buses 17 and 31 and the terminals 31. Although not shown, the microprocessor 3 is provided with a memory for storing sector and tag information representative of a data area of the sub-memory unit 4 stored by the cash memory 5. The microprocessor 3 decodes the command supplied thereto and judges whether or not the data required by the host processor 2 are stored in the cache memory 5 in response to the sector and tag information. When the data required by the host processor 2 is judged to be stored in the cache memory 5, the microprocessor 3 supplies the parameter register 501 and the address counter 504 with a set of information necessary for the data transfer between the interface unit 30 and the cache memory 5. The parameter register 401 is set with data including transfer-disable information deactivating the sequencer 403. The flag 402 is also reset to "0". Thus, the data transfer between the unit 30 and the memory 5 is brought into an enable-condition. In this condition, when the sequencer 503 receives the request signal DRQ1 from the unit 30, it returns the acknowledge signal DAK1 to the unit 30 via the OR gate 456. During the active level of the acknowledge signal DAK1, the sequencer 503 instructs the address counter 504 to supply the address information to the cache memory 5 through the bus 21 and the terminal 14, and further generates the memory read signal MRD and the data write control signal IOWR1. As a result, the data stored in an address location of the cache memory 5 designated by the address information supplied thereto is read out therefrom and then transferred to the interface control unit 30 via the bus 19. This data is in turn transferred to the host processor 2 from the unit 30. The address of the counter 504 is thereafter updated. The operation described above is repeated until the data thus transferred reaches the number of byte data to be transferred.

On the other hand, in case where the data required by the host processor 2 are not stored in the cache memory 5, that data has to be read out from the sub-memory unit 4 and then transferred to the host processor 2. At this time, the present data transfer control unit 40 transfers simultaneously the data from the buffer memory 50 to both of the cache memory 5 and the interface unit 30 in the following manner.

More specifically, the microprocessor 3 supplies the format control unit 60 with control information necessary to read data from the unit 4. The microprocessor 3 also supplies the parameter register 401 and the counter 404 with information necessary for the data transfer between the buffer memory 50 and the cache memory 5 and further sets the flag 402 to "1". The parameter register 501 is supplied with the transfer-disable information for deactivating the sequencer 503. Thus, the data read operation from the sub-memory unit 4 by the control unit 60 is initiated, and the simultaneous data transfer from the buffer memory 50 to each of the cache memory 5 and the interface unit 30 is brought into in an enable-condition.

Figure 3:
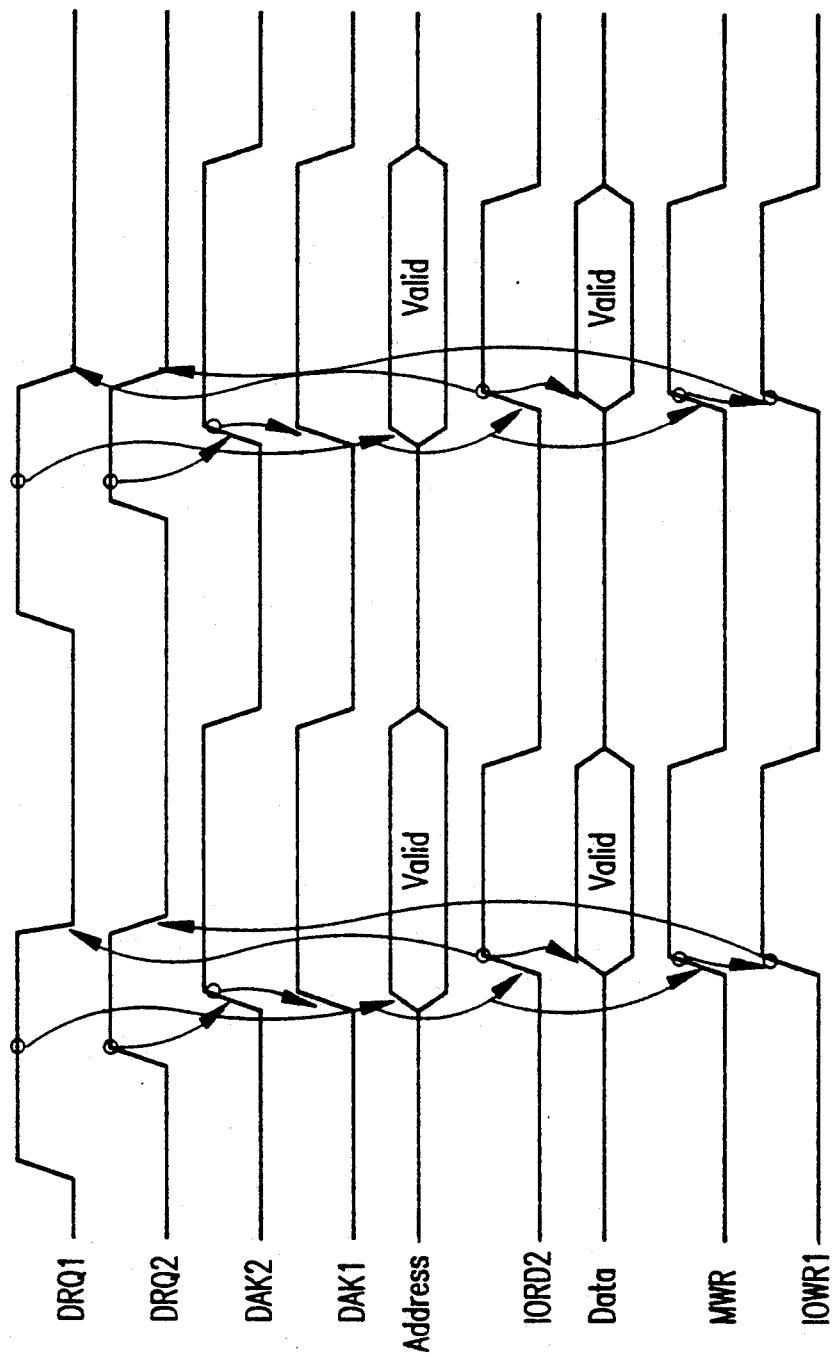
FIG. 3 is a timing chart representative of an operation of the control unit shown in FIG. 2.

In order to execute the simultaneous transfer, both of the buffer memory 50 and the interface unit 30 are required to be in a ready condition. To this end, the AND gates 451 and 453 detect the generation of both request signals DRQ1 and DRQ2. When both of the unit 30 and the memory 50 become ready, i.e. when both of the ready signals DRQ1 and DRQ2 are changed to the active high level as shown in FIG. 3, the data transfer sequencer 403 receives a true data request signal. In response thereto, the sequencer 403 returns the acknowledge signal DAK2 to the buffer memory 50. Since the sequencer 503 is deactivated, it does not produce the acknowledge signal even when receiving the request signal DRQ1. However, the generation of the acknowledge signal DAK2 causes the generation of the acknowledge signal DAK1 through the AND gate 454 and the OR gate 456, as shown in FIG. 3. The sequencer 403 then generates the read signal IORD2 and further instructs the address counter 404 to output the address information thereof which is in turn transferred via the bus 21 to the cache memory 5. In response to the signal IORD2, the buffer memory 50 reads the data therein onto the bus 19. The sequencer 403 further generates the memory write signal MWR which is in turn supplied to the memory 5 via the terminal 15. Although the sequencer 503 does not generate the write control signal, the generation of the memory write signal MWR causes the generation of the write control signal IOWR1 through the AND gate 458 and the OR gate 457. Thus, the data on the bus 19, which is read out of the buffer memory 50, is transferred to both of the cache memory 5 and the interface unit 30 simultaneously. The address of the counter 404 is thereafter updated. In response to the signals IORD2 and IOWR1, the buffer memory 50 and the interface unit 30 changes the request signals DRQ2 and DRQ1 to the low level, respectively. When both of the unit 30 and the memory 50 are in a ready condition again, the above-mentioned operation is performed.

Thus, the data from the buffer memory 50 is transferred simultaneously to both of the cache memory 5 and the interface unit 30, so that the speed of the data transfer is not lowered.

If the flag 402 is maintained at logic 0, the data from the buffer memory 50 is transferred only to the cache memory 5. The data thus stored in the memory 5 is then transferred to the unit 30 by use of the sequencer 503 and the counter 504.

The above embodiment does not have a construction for transferring the data, which is supplied from the host processor 2, from the interface unit 30 simultaneously to both of the cache memory 5 and the data buffer 50. For this reason, the data is first transferred from the interface unit 30 to the cache memory 5 by use of the sequencer 503 and then transferred from the cache memory 5 to the buffer memory 50 by use of the sequencer 403.

Figure 4:
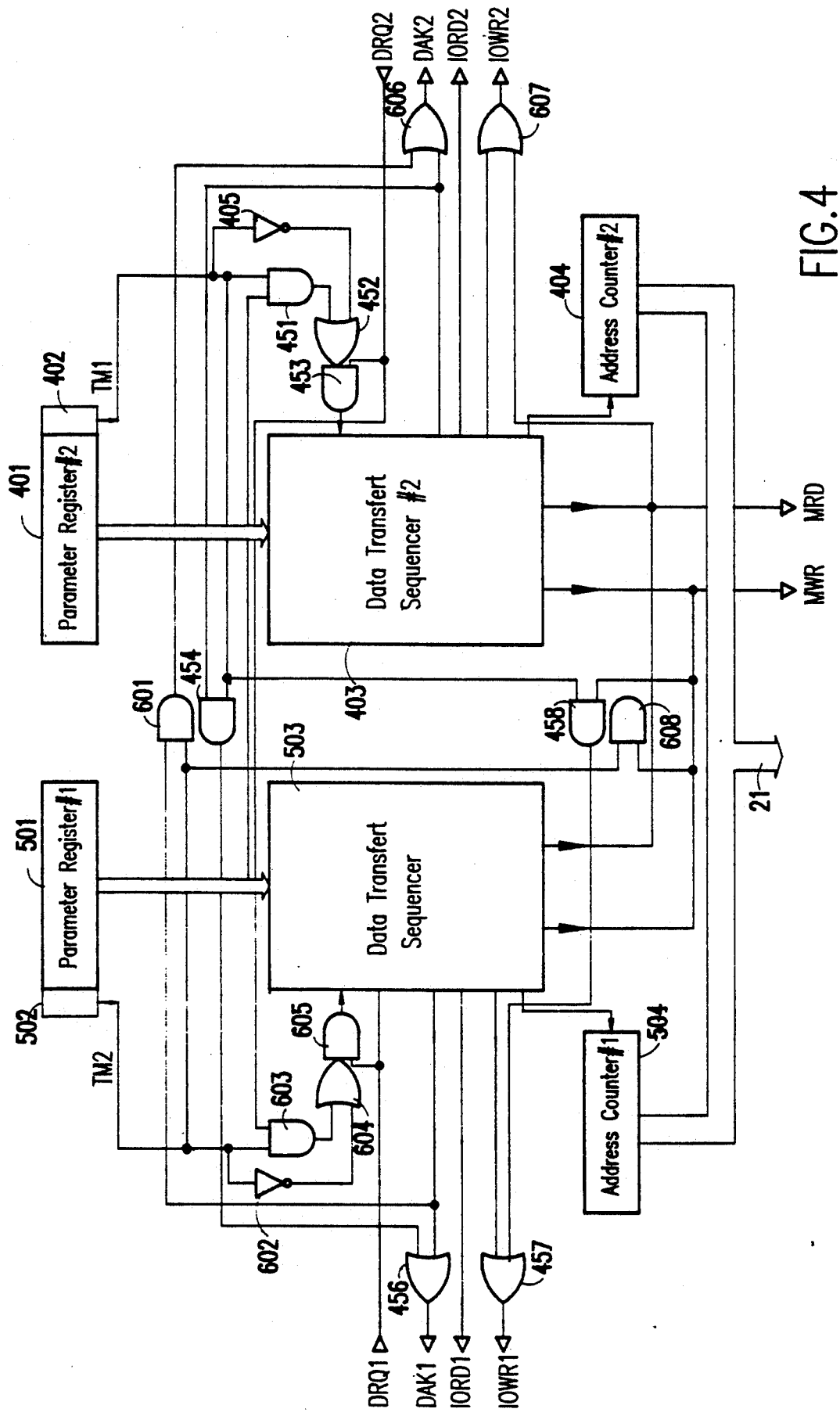
FIG. 4 is an internal block diagram representative of a data transfer control unit of a memory controller according to another embodiment of the present invention.

A construction for transferring data from the interface unit 30 simultaneously to both of the buffer and cache memories 50 and 5 is shown in FIG. 4 as another embodiment of the present invention. In this drawing, the same constituents as those shown in FIG. 2 are denoted by the same reference numerals to omit further description thereof. In this embodiment, there are further provided four AND gates 601, 603, 605 and 608, three OR gates 604, 606 and 607 and an inverter 602 which are connected as shown. Moreover, the parameter register 501 includes a flag 502 set to "1" or reset to "0" by the microprocessor 3.

Figure 5:
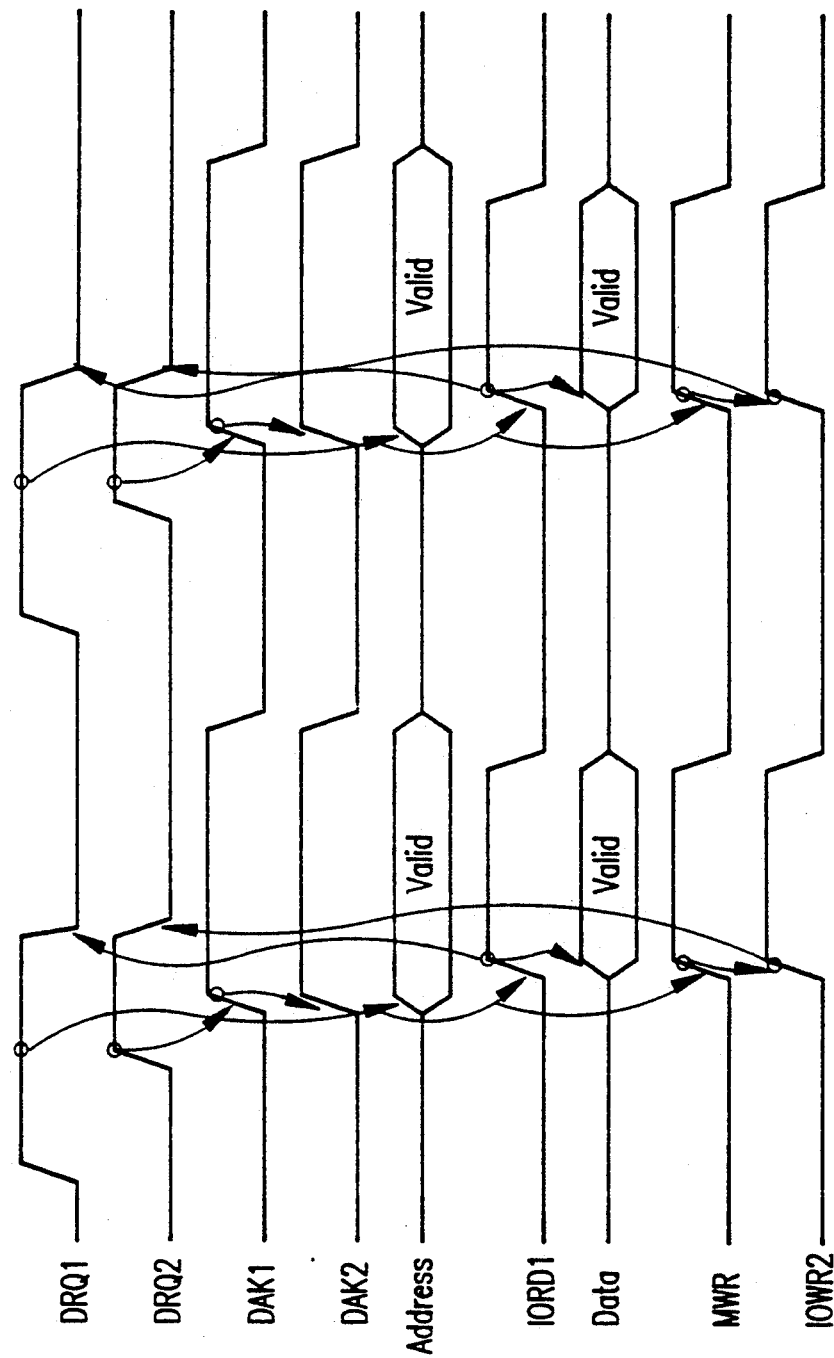
FIG. 5 is a timing chart representative of an operation of the control unit shown in FIG. 4.

In operation, when the microprocessor 3 detects that the host processor 2 requires to write data into the sub-memory unit 4 in response to the information from the interface unit 30, it supplies the register 501 and the counter 504 with information necessary to the data transfer between the unit 30 and the cache memory 5 and further sets the flag 502 to "1". Accordingly, when both of the interface unit 30 and the buffer memory 50 are in a ready condition, as shown in FIG. 5, the sequencer 503 receives a true data request signal. In response thereto, the sequencer 503 returns the acknowledge signal DAK1 to the unit 30 and further instructs the counter 504 to output the address. The generation of the signal DAK1 results in generation of the acknowledge signal DAK2 through the gates 601 and 606, as shown in FIG. 5. The sequencer 503 then generates the read signal IORD1 to the unit 30 and the write signal MWR to the cache memory 5. The generation of the signal MWR causes the generation of the write signal IOWR2 to the buffer memory 50 through the gates 608 and 607, as shown in FIG. 3. Thus, the data read out from the interface unit 30 is transferred simultaneously to both of the cache memory 5 and the buffer memory 50.

It is apparent that the present invention is not limited to the above embodiments, but may be modified and changed without departing from the scope and spirit of the invention. For example, the microprocessor 3 and/or the cache memory 5 may be incorporated into the memory controller 1 as a single integrated circuit chip.

What is claimed is:

1. A controller coupled to a host system, an external storage unit and a temporary memory for performing a data transfer thereamong, said controller comprising:
    an interface unit coupled to said host system,
    a buffer memory coupled to said external storage unit,
    a data transfer control unit coupled to said interface unit and said buffer memory,
    a bus for interconnecting said interface unit, said buffer memory and said temporary memory to one another,
    a microprocessor connected to said interface unit, said data transfer control unit and said buffer memory by a second bus,
    said data transfer control unit including sequencing means for generating first and second enable-signals substantially simultaneously and then generating one of first and second read signals and one of second and first write signals while instructing said temporary memory to fetch data onto said bus, and wherein said sequencing means comprises:
    a first parameter register storing data from said microprocessor defining transfer direction and transfer-enable information,
    a first data transfer sequencer connected to said first parameter register and responsive to a data request signal from said interface unit to generate said first enable-signal, said first read signal and said first write signal, said first data transfer sequencer generating instruction signals to said temporary memory to fetch data onto said first bus,
    a first address counter set by said microprocessor with a data transfer start address for said temporary memory, said first data transfer sequencer updating said first address counter when data is transferred between said first bus and said temporary memory,
    a second parameter register storing data from said microprocessor defining transfer direction and transfer-enable information,
    a second data transfer sequencer connected to said second parameter register and responsive to a data request signal from said buffer memory to generate said second enable-signal, said second read signal and said second write signal, said second data transfer sequencer generating instruction signals to said temporary memory to fetch data onto said first bus, and
    a second address counter set by said microprocessor with a data transfer start address for said temporary memory, said second data transfer sequencer updating said second address counter when data is transferred between said first bus and said temporary memory,
    said interface unit being supplied with said first enable-signal, said first read signal and said first write signal from said sequencing means for outputting data therein onto said bus in response to said first read signal while receiving said first enable-signal and for fetching data on said bus in response to said first write signal while receiving said first enable-signal, and
    said buffer memory being supplied with said second enable-signal, said second read signal and said second write signal from said sequencing means for outputting data therein onto said bus in response to said second read signal while receiving said second enable-signal and for fetching data on said bus in response to said second write signal while receiving said second enable-signal.

2. The controller claimed in claim 1 wherein said second parameter register includes a flag which, when set by said microprocessor, allows simultaneous data transfer from said buffer memory to said temporary memory and to said interface unit, said sequencing means further comprising logic means responsive to said data request signal from said interface unit for generating a data request signal to said second data transfer sequencer and responsive to said second enable-signal said second write signal for generating said first enable-signal and said first write signal when said flag is set.

3. The controller claimed in claim 2 wherein said first parameter register includes a second flag which, when set by said microprocessor, allows simultaneous data transfer from said interface unit to said temporary memory and to said buffer memory, said sequencing means further comprising second logic means responsive to said data request signal from said buffer memory for generating a data request signal to said first data transfer sequencer and responsive to said first enable-signal said first write signal for generating said second enable-signal and said second write signal when said second flag is set.

* * * * *